(12) United States Patent
McGoldrick

(10) Patent No.: US 7,921,406 B1
(45) Date of Patent: Apr. 5, 2011

(54) INCORPORATING TECHNICAL COMPUTING INTO A DBMS

(75) Inventor: Eugene McGoldrick, Newton, MA (US)

(73) Assignee: The MathWorks, Inc., Natick, MA (US)

(*) Notice: Subject to any disclaimer, the term of this patent is extended or adjusted under 35 U.S.C. 154(b) by 1476 days.

(21) Appl. No.: 11/299,524

(22) Filed: Dec. 12, 2005

(51) Int. Cl.
    *G06F 7/00* (2006.01)
    *G06F 17/30* (2006.01)
    *G06F 9/44* (2006.01)

(52) U.S. Cl. ........ 717/106; 717/107; 717/120; 717/163; 707/756; 707/759; 707/796; 707/802; 707/803; 707/805

(58) Field of Classification Search .......... 707/1, 6, 707/100, 102, 103, 104.1; 717/106, 107, 717/120, 121, 162, 163, 164
    See application file for complete search history.

(56) References Cited

U.S. PATENT DOCUMENTS

| | | | |
|---|---|---|---|
| 5,553,234 A * | 9/1996 | Cotner et al. ................ 714/16 |
| 6,134,559 A * | 10/2000 | Brumme et al. ......... 707/103 R |
| 6,167,405 A * | 12/2000 | Rosensteel et al. ........... 707/102 |
| 6,256,676 B1 * | 7/2001 | Taylor et al. ................ 709/246 |
| 6,272,675 B1 * | 8/2001 | Schrab et al. ................ 717/100 |
| 6,301,581 B1 * | 10/2001 | Smiley ........................ 707/718 |
| 6,393,435 B1 * | 5/2002 | Gartner et al. ...................... 1/1 |
| 6,477,540 B1 * | 11/2002 | Singh et al. ........................ 1/1 |
| 6,523,027 B1 * | 2/2003 | Underwood ........................ 1/1 |
| 6,640,238 B1 * | 10/2003 | Bowman-Amuah .......... 709/201 |
| 6,684,387 B1 * | 1/2004 | Acker et al. .................. 717/126 |
| 6,757,690 B2 * | 6/2004 | Aldrich et al. ............... 707/702 |
| 2002/0120917 A1 * | 8/2002 | Abrari et al. .................. 717/110 |
| 2002/0143498 A1 * | 10/2002 | Turnaus et al. ............... 702/188 |
| 2003/0172368 A1 * | 9/2003 | Alumbaugh et al. ......... 717/106 |
| 2004/0006762 A1 * | 1/2004 | Stewart et al. ............... 717/106 |
| 2004/0015783 A1 * | 1/2004 | Lennon et al. ............... 715/523 |
| 2004/0039727 A1 * | 2/2004 | Dessloch et al. .................. 707/1 |
| 2006/0095405 A1 * | 5/2006 | Anderson et al. .................. 707/3 |

OTHER PUBLICATIONS

Gannod et al., Nov. 2000, IEEE Seventh Working Conference on Reverse Engineering, p. 128.*
Riazi, Feb. 27, 2004, The Code Project.*
"MATLAB The Language of Technical Computing: External Interfaces Version 7," The MathWorks, Inc., Jun. 2004, pp. i to x, 1-1 to 1-34, 2-1 to 2-26, 3-1 to 3-48, 4-1 to 4-56, 5-1 to 5-40, 6-1 to 6-20, 7-1 to 7-88, 8-1 to 8-85, 9-1 to 9-119, and Index-1 to Index-15.

* cited by examiner

*Primary Examiner* — Emerson C Puente
*Assistant Examiner* — Jonathan R Labud
(74) *Attorney, Agent, or Firm* — Cesari and McKenna, LLP; Michael R. Reinemann

(57) ABSTRACT

The present invention enables customized technical computing within a database. The present invention provides a method and system to insert a software function implemented in a technical computing environment into a database to manipulate data and use the software function as a database procedure. Once the software function is generated, in response to a single action being performed, two components are generated and stored in the database. The two components working together allow the software function to be invoked as a database procedure. The present invention offloads a user's burden to learn the often complicated database query language and decreases the amount of network traffic between a client computer and a database.

25 Claims, 2 Drawing Sheets

INCORPORATING TECHNICAL COMPUTING INTO A DBMS

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention generally relates to databases, and specifically relating to using technical computing in databases.

BACKGROUND OF THE INVENTION

A database is an organized collection of data that enables the data to be retrieved, updated, and managed. Databases may include many different types of data, such as texts, numbers, graphics, media, and other types of information. Databases are commonly used to store data for many applications and systems, such as inventory systems, medical record-keeping systems, financial record-keeping systems, airline reservation systems, and other systems.

To access and manage a database, a database management system (DBMS) is commonly utilized, such as in accounting, human resources, and customer support systems. Typically, for every database, there is a schema, a structural description of the type of data held in the database. The schema describes the data that are represented in the database, and the relationships among them. There are many different ways of organizing a schema. In other words, there are many ways to model a database structure. Such a model is referred to as a "database model" or a "data model". DBMSs are usually categorized according to the data model that they support: relational, object-relational, network, and so on. The data model usually determines the types of query languages that are available to access the database.

One popular query language is the Structured Query Language (SQL). However, SQL, like many other query languages, only has a relatively small set of commands that one can use to manipulate data. Additionally, a user needs to understand the rules for formulating the query and to program the query according to the requirements, and the syntax for the query language is usually rather complex. Additionally, when a user needs to manipulate a large set of data, the user will usually use a technical computing program, such as MATLAB® of The Mathworks, Inc. from Natick, Mass., running on a client computer to write code to connect to the database and then submit queries one by one to retrieve data and then perform calculations, such as statistical analysis, using the data. After calculations are done in the technical computing environment, users sometimes need to connect to the database again and submit queries to store calculation results in the database. However, this method requires the user to understand the syntax of the query language to connect to the database to read and write data, and it also requires a great deal of network traffic. Hence, there is a need to simplify this process.

SUMMARY OF THE INVENTION

The present invention enables customized technical computing within a DBMS. The present invention provides a method and system to insert a software function implemented in a technical computing environment into a DBMS to manipulate data and use the software function as a database procedure.

In one embodiment of the present invention, a method of inserting a software function into a database is introduced. The method includes the step of providing a software function that is implemented in a technical computing environment. The method also includes the step of selecting a target database where the software function is desired to be stored, wherein the target database is managed by a DBMS that has an API. The method further includes the step of in response to a single action being performed, automatically generating in the technical computing environment a first component containing the software function and a second component acting as an interface between the target database and the first component. The method also includes the step of storing the first component and the second component in the target database, wherein the second component is used to invoke the first component by the target database as either a stored procedure or a database trigger.

In one aspect of the present invention, the first component is either a COM object, a JAVA jar file, or a library built in the technical computing environment. In another aspect of the present invention, the second component is either a VBA module, a PL/SQL module, or a JAVA module. In still another aspect of the present invention, the database management system is either an Open Database Connectivity (ODBC) compliant system or a Java Database Connectivity (JDBC) compliant system. In yet another aspect of the present invention, the technical computing environment is provided by a MATLAB based software product. In a further aspect of the present invention, the single action is clicking of a button. In still another aspect of the present invention, the single action is choosing an item in a drop-down menu. In yet another aspect of the present invention, the single action is a specific sequence and combination of keystrokes. In still another aspect of the present invention, the method further includes the step of custom building the software function in the technical computing environment. In yet another aspect of the present invention, the method further includes the step of identifying at least one of a table or an associate field where data is retrieved or entered.

In another embodiment of the present invention, a computing device including a storage medium storing a method for inserting a software function into a database is provided. The method includes the step of providing a software function that is implemented in a technical computing environment. The method also includes the step of selecting a target database where the software function is desired to be stored, wherein the target database is managed by a database management system that has an API. The method further includes the step of in response to a single action being performed, automatically generating in the technical computing environment a first component containing the software function and a second component acting as an interface between the target database and the first component. The method also includes the step of storing the first component and the second component in the target database, wherein the second component is used to invoke the first component by the target database as either a stored procedure or a database trigger.

In still another aspect of the present invention, a system for inserting a software function into a database is introduced. The system includes a technical computing program including a technical computing environment. The system also includes a software function that is implemented in the technical computing environment. The system further includes a target database and a database management system for managing the target database using an API. The system also includes a software module that in response to a single action being performed, automatically generates in the technical computing environment a first component containing the software function and a second component acting as an interface between the target database and the first component and stores the first and second component in the target database, wherein the second component is used to invoke the first component by the target database as either a stored procedure or a database trigger.

In one aspect of the present invention, the first component is either a COM object, a JAVA jar file, or a library built in the technical computing environment. In another aspect of the present invention, the second component is either a VBA module, a PL/SQL module, or a JAVA module. In yet another aspect of the present invention, the database management system is either an Open Database Connectivity (ODBC) compliant system or a Java Database Connectivity (JDBC) compliant system. In still another aspect of the present invention, the technical computing program is a MATLAB based software product.

BRIEF DESCRIPTION OF THE FIGURES

The foregoing and other objects, aspects, features, and advantages of the invention will become more apparent and may be better understood by referring to the following description taken in conjunction with the accompanying drawings, in which.

DETAILED DESCRIPTION OF THE INVENTION

The present invention provides a method and system to insert a software function into a DBMS to manipulate data and use the software function as a stored procedure, where the software function is implemented in a technical computing environment providing a wider range of data manipulation capability than the database itself. A stored procedure is a procedure that is physically stored within a database. They are usually written in a proprietary database language, such as Procedural Language SQL (PL/SQL) for Oracle database. The advantage of a stored procedure is that when it is run, in response to a request, it is run directly by the database engine, which usually runs on a separate database server and is generally faster at processing database requests. The database server has direct access to the data it needs to manipulate and only needs to send the final results back to the user. This prevents the many overhead of communicating potentially large amounts of data back and forth between a client machine and the database. A stored procedure that runs a series of queries will usually run faster as a stored procedure than if it had been implemented as a program running on a client computer that communicates with the database by submitting queries.

The stored procedure also can simplify data management when a database is manipulated from many external programs. Embedding logic in the database using stored procedures eliminates the need to duplicate the same logic in each the program that accesses the data. This simplifies the creation and maintenance of the programs involved. One of ordinary skill in the art will appreciate that other database procedures, such as database triggers, may be utilized with the present invention instead of stored procedures.

Furthermore, another advantage of the present invention is that a user can use a technical computing program with an easier programming language to create a custom function that the user wishes to use to manipulate data in the database. The user does not need to learn about the syntax of the proprietary database language and then manually write code to achieve the same purpose, which is a cumbersome, error prone, and time-consuming process. The present invention enables the transformation of a function implemented in a technical computing environment to a stored procedure or database trigger in response to a single action being performed.

Figure 1:
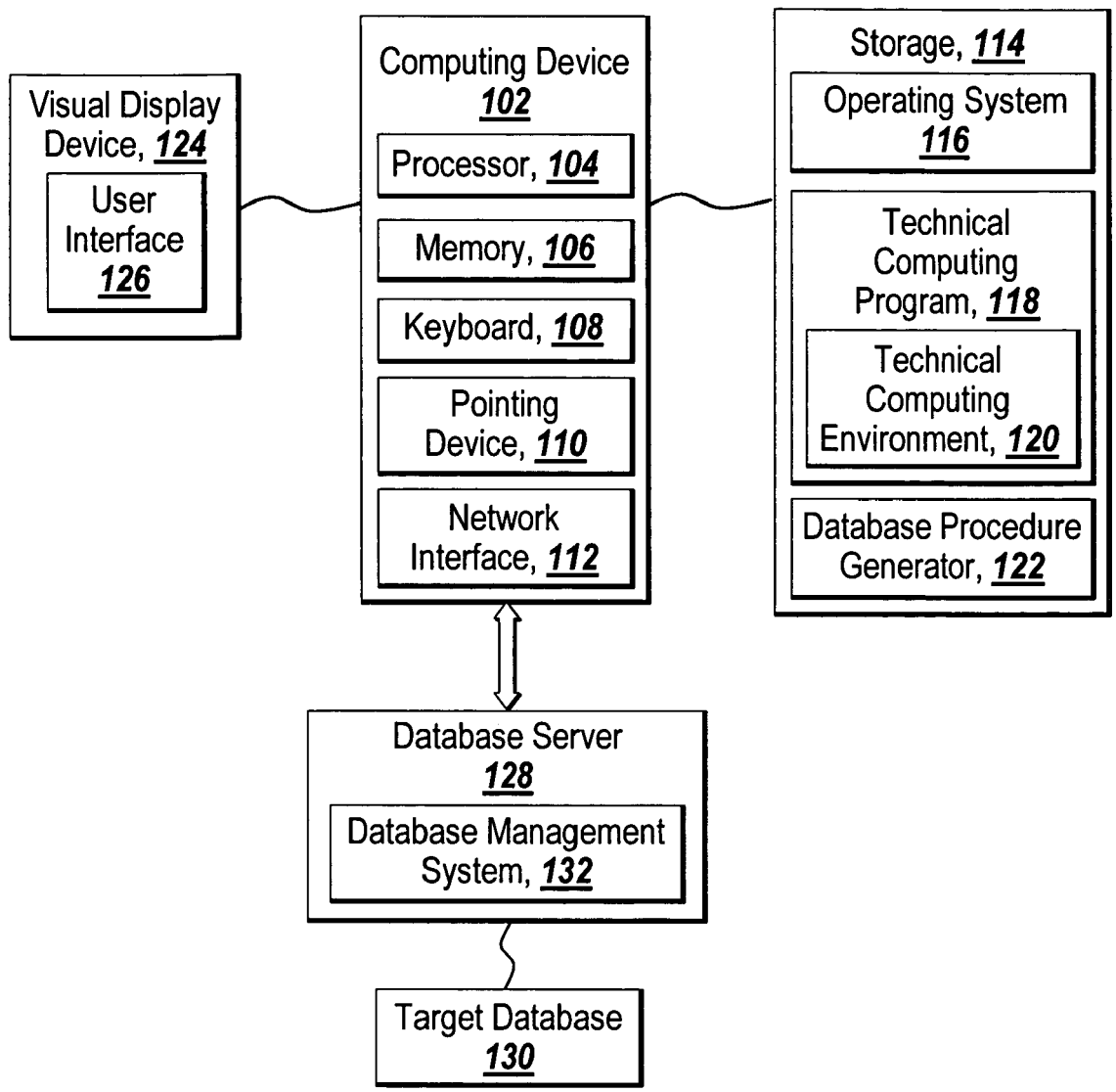
FIG. 1 depicts an environment suitable for practicing an illustrative embodiment of the present invention.

FIG. 1 depicts an environment suitable for practicing an illustrative embodiment of the present invention. The environment includes a computing device 102 having memory 106, on which software according to one embodiment of the present invention may be stored, one or more processors 104 for executing software stored in the memory 106 and other programs for controlling system hardware. Each of the one or more processors 104 can be a single or multiple core processor wherein each of the cores may execute portions of the code for practicing embodiments of the present invention. Virtualization can be employed in computing device 102 so that infrastructure and resources in the computing device can be shared dynamically. Virtualized processors may also be used with technical computing program 118 and other software in storage 114. A virtual machine can be provided to handle a process running on multiple processors so that the process appears to be using only one computing resource rather than multiple. Multiple virtual machines can also be used with one processor. Other computing resources, such as FPGA, ASIC, DSP, and GPP, may also be used for executing code and/or software. A hardware accelerator can additionally be used to speed up the general processing rate of the computing device 102.

The memory 106 may comprise a computer system memory or random access memory such as DRAM, SRAM, EDO RAM, etc. The memory 106 may comprise other types of memory as well, or combinations thereof. A human user may interact with the computing device 102 through a visual display device 124 such as a computer monitor, which may include a user interface 126 that a user may use to interact with technical computing program 118. The computing device 102 may include other I/O devices such as a keyboard 108 and a pointing device 110, for example a mouse or stylus, for receiving input from a user. Optionally, the keyboard 108 and the pointing device 110 may be connected to the visual display device 124. The computing device 102 may include other suitable conventional I/O peripherals. The computing device 102 may further comprise a storage device 114, such as a hard-drive or CD-ROM, for storing an operating system 116 and other software, and for storing a database procedure generator 122 and a technical computing program 118, such as MATLAB® of The MathWorks, Inc. from Natick, Mass., including a technical computing environment 120. Those skilled in the art will appreciate that database procedure generator 122 can be a software module that is adaptable to be included as part of the technical computing program 118 or a stand alone application that responds to calls from the technical computing program 118. Additionally, the operating system and the technical computing program 118 of the present invention can be run from a bootable CD, such as, for example, KNOPPIX®, a bootable CD for GNU/Linux.

Additionally, the computing device 102 may include a network interface 112 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 112 may comprise a built-in network adapter, network interface card, PCMCIA network card, card bus network adapter, wireless network adapter, USB network adapter, modem or any other device suitable for interfacing the computing device 102 to any type of network capable of communication and performing the operations described herein. Moreover, the computing device 102 may be any computer system such as a workstation, desktop computer, server, laptop, handheld computer or other form of computing or telecommunications device that is capable of communication and that has sufficient processing power and memory capacity to perform the operations described herein. Furthermore, computing device 102 can communicate with a target database 130 via a database server 128 that has a database management system 132 for managing the target database 130 using an API. Using the database management system 132, the computing device 102 can manage the target database 130, such as read or write data and make queries regarding data in the target database 130. Database management system 132 can be, but not limited to, a system that is Open Database Connectivity (ODBC) or Java Database Connectivity (JDBC) compliant, such as DB2® Universal Database and Informix software of International Business Machine Corporation from Armonk, N.Y.; Ingres® Open Source of Computer Associates from Islandia, N.Y.; Microsoft Access, Microsoft Excel, Microsoft SQL server of Microsoft Corporation from Redmond, Wash., MySQL® of MySQL AB from Sweden; Oracle Database of Oracle International Corporation from Redwood Shores, Calif.; PostgreSQL, Sybase SQL Server, and Sybase SQL Anywhere.

The illustrative embodiment will be described solely for illustrative purposes relative to a MATLAB® technical computing environment. Although the illustrative embodiment will be described relative to a MATLAB®-based application, one of ordinary skill in the art will appreciate that the present invention may be applied to other technical computing environments, such as technical computing environments using software products of LabVIEW® or MATRIXx from National Instruments, Inc., or Mathematica® from Wolfram Research, Inc., or Mathcad of Mathsoft Engineering & Education Inc., or Maple™ from Maplesoft, a division of Waterloo Maple Inc.

Figure 2:
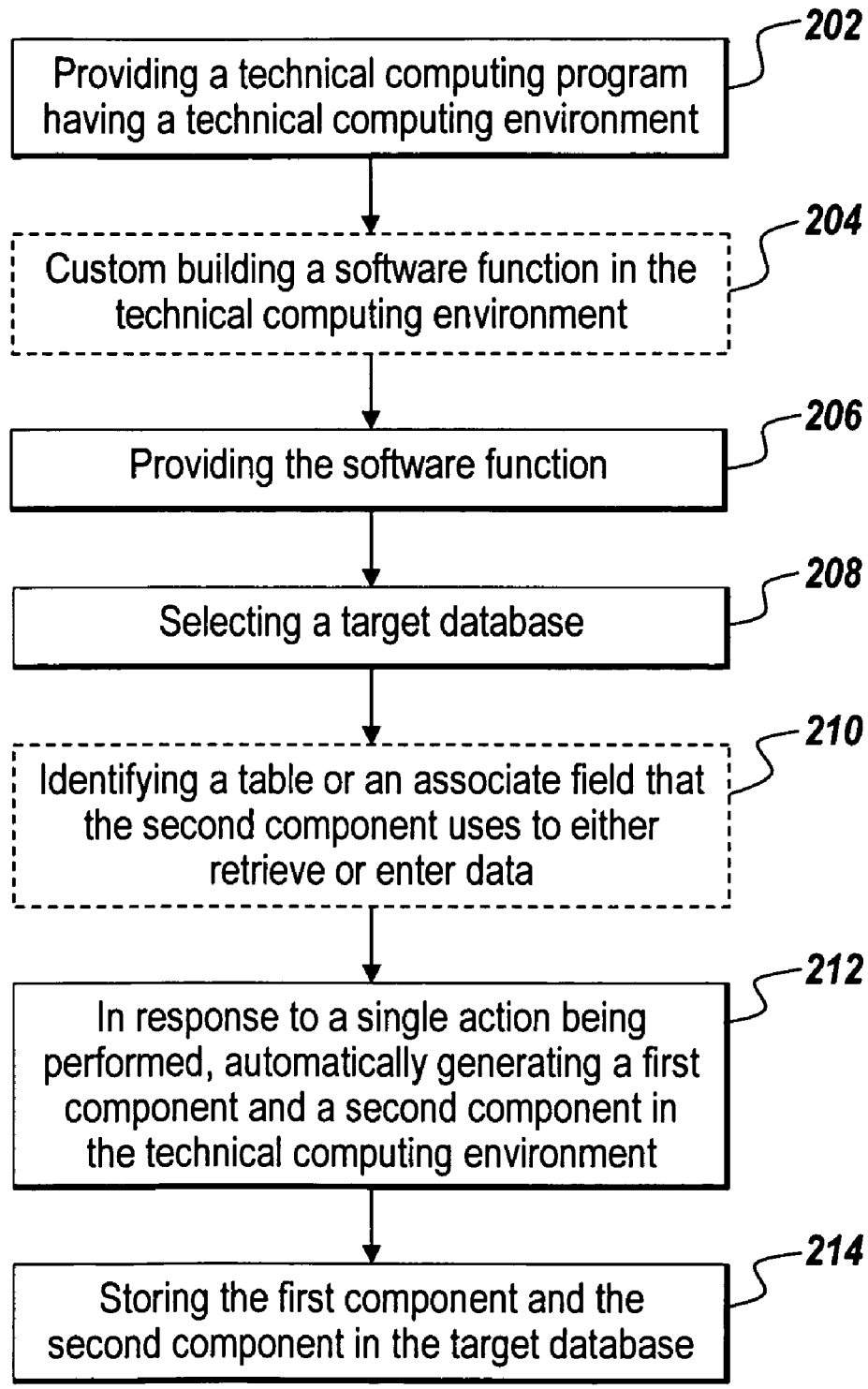
FIG. 2 illustrates a flowchart that depicts the steps taken to practice one embodiment of the present invention.

FIG. 2 shows a flowchart for practicing one embodiment of the present invention. A technical computing program 118 having a technical computing environment 120 is provided in step 202. A user may have the option to choose to custom build a software function in the technical computing environment in step 204 or the user may choose to use existing software functions provided with the technical computing program 118. The software function is then provided to the technical computing program 118 in step 206. A target database is selected in step 208. In one embodiment of the present invention, the technical computing program 118 is capable of identifying a type of the database management system upon selection of the target database such that one or more specific types of application programming interface (API) associated with the type of the database management system is used later for generation of components. Alternatively, the technical computing environment 118 may request the user to provide information regarding the type of the database management system.

A specific table or an associate field may optionally be identified in step 210 so that data may be retrieved or entered. A user may specify a table or an associate field where data is retrieved for computation by the software function. A user may also specify a table or an associate field where results of the computation of the software function may be entered and written. A single action may be performed by a user or programmatically and in response to the single action being performed, the technical computing program 118 automatically generates a first component and a second component in the technical computing environment in step 212. The first component may be, but not limited to, a COM object, a JAVA jar file, a .NET object, or a library file that contains the algorithm of the software function. The second component may be, but not limited to, a VBA module, a PL1SQL module, or a JAVA module that will invokes the first component from within the target database. Once the first component and the second component are generated, they are then stored in the target database in step 214. The second component enables the algorithm of the software function to be invoked as a database procedure, such as a stored procedure or a database trigger. The second component uses the API associated with the specific database management system that manages the target database to enable the first component to interact with the database. The second component can be viewed as a wrapper for the first component so that even though the programming language and the compatibility of the first component is different from the specific database management system, the second component is able to act as the interpreter between the database management system and the first component so that messages and data may be communicated seamlessly between the database management system and the first component.

A software function can be implemented using many different programming languages. As way of an example, each MATLAB® function is stored in an m-file. A simple sum function can be implemented in MATLAB® with an m-file named "sumThem". The sumThem.m can contain the following sample code:

function returnVal=sumThem(a, b)
    returnVal=a+b;

A first component generated from a function can be implemented in many different ways, such as one described in U.S. patent application Ser. No. 10/190,288 which is incorporated herein by reference. A builder tool can be provided for database procedure generator 122 to build a first component using a COM object that is associated with the sumThem.m file. The builder tool automatically generates a COM object that includes a class with a method that will associate the class method with the m file sumThem.m. A user can provides the specific class name and the COM object name to be used by the builder tool to incorporate the function defined in sumThem.m. For example, if "OracleSum_1_0.dll" is the COM object and the class is called oracleSumClass, a command can be executed such that the oracleSumClass will have a method called "sumThem" that corresponds to the sumThem.m file. In a preferred embodiment of the present invention, a GUI is provided such that a build option can be implemented as a button. Once clicking on the build option button, a command such as the following can be passed to the MATLAB command line to generate a COM object that invokes the sumThem.m function as a class method:

mcc -M -silentsetup -d '/D:/work/databases/oracleSum// src' -B ccom:oracleSum, oracleSumclass, 1.0' -S 'D:/work/databases/sumThem.m'

The generated COM object OracleSum_1_0.dll can be invoked within a ORACLE database with the following PL/SQL code. The following PL/SQL code is an example of a second component that is used to call a first component that is a MATLAB® generated COM object (here the OracleSum_1_0.d11 COM object). The following code is automatically generated by the database procedure generator 122 so that a user does not need to learn the API or programming language for a database to use a function that was implemented outside of the database.

```
Rem
Rem NAME
Rem MATLABCOM.sql - APIs to enables Oracle callouts to MATLAB COM Object
Rem DESCRIPTION
REM Demonstrate Oracle Database callouts using the COM-Cartridge to MATLAB COM Object
REM
REM
REM
set serveroutput on;
drop package ORDMATLAB; /*if this package already exist in the database, then clear the old code and inserts the new code below */
/*the following code starts the insertion process of the code in the database*/
CREATE PACKAGE ORDMATLAB AS
    /* Declare externally callable subprograms. */
    FUNCTION CreateMATLABCOMObj (servername varchar2)
return binary_integer;
END ORDMATLAB;
/
CREATE PACKAGE BODY ORDMATLAB AS
/*TYPE returnVal_array IS VARRAY(1) OF SYS.AnyData;
retVal returnVal_array;*/
applicationToken binary_integer:=-1;
i binary_integer;
retNum double precision;
retVal ANYDATA; /*double precision;*/
val1 double precision;
val2 double precision;
error_src varchar2(255);
error_description varchar2(255);
error_helpfile varchar2(255);
error_helpID binary_integer;
/*the following code specifies what the externally callable subprogram will do, which is calling the MATLAB generated COM object*/
FUNCTION   CreateMATLABCOMObj(servername   varchar2) return
binary_integer IS
BEGIN
    dbms_output.put_line('Creating   MATLAB   COM Object . . . ');
    i:=ORDCOM.CreateObject('OracleSum.OracleSumClass.1_0 ', 0, servername,applicationToken); /* this object is created in the database so that it can be associated with the MATLAB COM object. This newly created object allows the MATLAB COM object functions to be called from within the database */
    IF (i!=0) THEN
    ORDCOM.GetLastError(error_src, error_description, error_helpfile, error_helpID);
    dbms_output.put_line(error_src);
    dbms_output.put_line(error_description);
    dbms_output.put_line(error_helpfile);
    END IF;
    dbms_output.put_line('MATLAB COM object created.');
    val1:=140;
    val2:=150;
    ORDCOM.InitArg( )
    ORDCOM.SetArg(1, 'I2');
    ORDCOM.SetArg(retVal, 'pR8');
    ORDCOM.SetArg(val1, 'R8');
    ORDCOM.SetArg(val2,'R8');
/* the following code invokes the first component as a stored procedure */
    i:=ORDCOM.Invoke(applicationToken,  'sumThem',4, retNum); /*this method is trying to invoke the sumThem function in the MATLAB COM object */
    IF (i!=0) THEN
    ORDCOM.GetLastError(error_src, error_description, error_helpfile, error_helpID);
    dbms_output.put_line(error_src);
    dbms_output.put_line(error_description);
    dbms_output.put_line(error_helpfile);
    END IF;
    dbms_output.put_line('MATLAB COM object method invoked.');
    ORDCOM.InitOutArg( )
    ORDCOM.GetArg (retVal,'pR8');
    dbms_output.put_line('Value   Returned   from   the method:');
    /*dbms_output.put_line(retVal); */
    return i;
END CreateMATLABCOMObj;
END ORDMATLAB;
/
© Copyrighted by The MathWorks, Inc.
```

The present invention enables the transformation of a function implemented in a technical computing environment to a stored procedure or database trigger in response to a single action being performed. The present invention offloads a user's burden to learn the often complicated database query language and decreases the amount of network traffic between a client computer and a database.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

I claim:

1. A method of inserting a software function into a database, said method comprising:
   providing a software function that is implemented in a technical computing environment;
   storing the software function in a memory of a computing device having a processor coupled to the memory;
   selecting a target database where the software function is desired to be stored, wherein the target database is managed by a database management system that implements a database query language that differs from the technical computing environment;
   automatically identifying, by the processor, an interface type associated with the database management system of the selected target database;
   in response to a single action being performed, automatically generating in the technical computing environment by the processor:
      a first component containing the software function, and
      a second component acting as an interface between the target database and the first component, the second component using the interface type identified automatically by the processor as being associated with the database management system; and storing the first component and the second component in the target database, wherein the second component is used by the database management system to invoke the first component as at least one of:

a stored procedure, and a database trigger of the target database.

2. The method of claim 1, wherein the first component is either a COM object, a JAVA jar file, or a library built in the technical computing environment.

3. The method of claim 1, wherein the second component is either a VBA module, a PLlSQL module, or a JAVA module.

4. The method of claim 1, wherein the database management system is either an Open Database Connectivity (ODBC) compliant system or a Java Database Connectivity (JDBe) compliant system.

5. The method of claim 1, wherein the technical computing environment is a text-based, dynamically typed programming environment that supports matrix manipulation.

6. The method of claim 1, wherein the single action is clicking of a button.

7. The method of claim 1, wherein the single action is choosing an item in a dropdown menu.

8. The method of claim 1, wherein the single action is a specific sequence and combination of keystrokes.

9. The method of claim 1 further comprising:

custom building the software function in the technical computing environment.

10. The method of claim 1 further comprising:

identifying at least one of a table or an associate field where data is retrieved or entered.

11. In a computing device, a storage medium storing a method for inserting a software function into a database, the method comprises:

providing a software function that is implemented in a technical computing environment;

selecting a target database where the software function is to be stored, wherein the target database is managed by a database management system that has an Application Programming Interface (API) and implements a database query language that is different from the technical computing environment;

automatically identifying, by a processor, the API of the database management system of the selected target database;

in response to a single action being performed, automatically generating in the technical computing environment:

a first component containing the software function, and a second component acting as an interface between the target database and the first component, the second component using the API that was identified automatically by the processor as being associated with the database management system; and storing the first component and the second component in the target database, wherein the second component is used by the database management system to invoke the first component as at least one of a stored procedure and a database trigger of the target database.

12. The medium of claim 11, wherein the first component is either a COM object, a JAVA jar file, or a library built in the technical computing environment.

13. The medium of claim 11, wherein the second component is either a VBA module, a PLlSQL module, or a JAVA module.

14. The medium of claim 11, wherein the database management system is either an Open Database Connectivity (ODBC) compliant system or a Java Database Connectivity (JDBC) compliant system.

15. The medium of claim 11, wherein the technical computing environment is a text-based, dynamically typed programming environment that supports matrix manipulation.

16. The medium of claim 11, wherein the single action is clicking of a button.

17. The medium of claim 11, wherein the single action is choosing an item in a dropdown menu.

18. The medium of claim 11, wherein the single action is a specific sequence and combination of keystrokes.

19. The medium of claim 11, wherein the method further comprises: custom building the software function in the technical computing environment.

20. The medium of claim 11, wherein the method further comprises: identifying at least one of a table or an associate field where data is either retrieved or entered.

21. A system for inserting a software function into a database, the system comprises:

a technical computing program including a technical computing environment;

a software function that is stored on a memory and implemented in the technical computing environment;

a target database;

a database management system for managing the target database, the database management system using an Application Programming Interface (API) and implementing a database query language that is different from the technical computing environment; and a software module executable by a processor coupled to the memory that in response to a single action being performed, causes the processor to:

automatically identify the API used by the database management system of the target database, automatically generate in the technical computing environment:

a first component containing the software function, and a second component acting as an interface between the target database and the first component, the second component utilizing the API that was identified automatically by the processor as being used by the database management system, and store the first and second component in the target database, wherein the second component is used by the database management system to invoke the first component as at least one of a stored procedure and a database trigger of the target database.

22. The system of claim 21, wherein the first component is either a COM object, a JAVA jar file, or a library built in the technical computing environment.

23. The system of claim 21, wherein the second component is either a VBA module, a PLlSQL module, or a JAVA module.

24. The system of claim 21, wherein the database management system is either an Open Database Connectivity (ODBC) compliant system or a Java Database Connectivity (JDBC) compliant system.

25. The system of claim 21, wherein the technical computing program is a text-based, dynamically typed programming environment that supports matrix manipulation.

* * * * *

UNITED STATES PATENT AND TRADEMARK OFFICE
CERTIFICATE OF CORRECTION

| | | |
|---|---|---|
| PATENT NO. | : 7,921,406 B1 | Page 1 of 1 |
| APPLICATION NO. | : 11/299524 | |
| DATED | : April 5, 2011 | |
| INVENTOR(S) | : Eugene McGoldrick | |

It is certified that error appears in the above-identified patent and that said Letters Patent is hereby corrected as shown below:

Col. 8, line 52 should read; ~~desired~~ to be stored, where the target database is man- Signed and Sealed this
Nineteenth Day of June, 2012

David J. Kappos
*Director of the United States Patent and Trademark Office*